(12) United States Patent
Nylander et al.

(10) Patent No.: US 9,872,172 B2
(45) Date of Patent: Jan. 16, 2018

(54) IDENTIFYING A USER EQUIPMENT IN A COMMUNICATION NETWORK

(71) Applicant: TELEFONAKTIEBOLAGET L M ERICSSON (PUBL), Stockholm (SE)

(72) Inventors: Tomas Nylander, Värmdö (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 14/892,495

(22) PCT Filed: May 29, 2013

(86) PCT No.: PCT/EP2013/061074
§ 371 (c)(1),
(2) Date: Nov. 19, 2015

(87) PCT Pub. No.: WO2014/191032
PCT Pub. Date: Dec. 4, 2014

(65) Prior Publication Data
US 2016/0127891 A1    May 5, 2016

(51) Int. Cl.
*H04W 8/26* (2009.01)
*H04W 76/02* (2009.01)
*H04W 8/20* (2009.01)
*H04L 29/12* (2006.01)

(52) U.S. Cl.
CPC ........... *H04W 8/26* (2013.01); *H04L 61/2007* (2013.01); *H04W 76/021* (2013.01); *H04L 61/2046* (2013.01); *H04W 8/20* (2013.01)

(58) Field of Classification Search
CPC ....... H04W 8/26; H04W 76/021; H04W 8/20; H04L 61/2007; H04L 61/2046
See application file for complete search history.

(56) References Cited

U.S. PATENT DOCUMENTS

| | | | |
|---|---|---|---|
| 2002/0010683 A1 | 1/2002 | Aune | |
| 2007/0036109 A1* | 2/2007 | Kwak | H04W 36/0066 370/331 |
| 2007/0105555 A1 | 5/2007 | Miernik et al. | |
| 2010/0322106 A1 | 12/2010 | Qiang | |
| 2011/0128907 A1* | 6/2011 | Kvernvik | H04L 12/5691 370/328 |

(Continued)

*Primary Examiner* — Min Jung
(74) *Attorney, Agent, or Firm* — Patent Portfolio Builders, PLLC

(57) ABSTRACT

A method and apparatus for identifying a User Equipment (UE) in a communication network. A service aware control signalling node associated with a transmission path related to the UE receives a first message sent from a Radio Access Network (RAN) node associated with the UE on the transmission path. The first message initiates a communication between the RAN node and the control signalling node and includes an identity of the UE. On its own, the identity of the UE is not enough to unambiguously identify the UE, as described above. The control signalling node stores at a database an identity of the UE and an identity of the transmission path via which the first message was sent. The combination of the UE identity and the transmission path identity can be used to uniquely identify the UE.

17 Claims, 9 Drawing Sheets

(56) References Cited

U.S. PATENT DOCUMENTS

| | | | |
|---|---|---|---|
| 2014/0022898 A1* | 1/2014 | Kim | H04W 8/22 370/230 |
| 2014/0133456 A1* | 5/2014 | Donepudi | H04W 88/10 370/331 |
| 2014/0235200 A1* | 8/2014 | Cai | H04W 4/24 455/406 |
| 2015/0282029 A1* | 10/2015 | Faccin | H04W 36/0022 370/331 |

* cited by examiner

IDENTIFYING A USER EQUIPMENT IN A COMMUNICATION NETWORK

This application is a 371 of International Application No. PCT/EP2013/061074, filed May 29, 2013, the disclosure of which is fully incorporated herein by reference.

TECHNICAL FIELD

The present invention relates to the field of identifying a User Equipment in a communication network.

BACKGROUND

Different Radio Access Technologies (RATs) are available for mobile communications, allowing a user of a user device such as a mobile terminal (termed herein User Equipment, UE) to access communication services like voice calls, Internet browsing, video calls, file transmissions, audio/video streaming, electronic messaging and e-commerce. RATs can be divided into different categories.

A first category includes RATs suitable for use in mobile or cellular telecommunications systems like GSM (Global System for Mobile Communications), UMTS (Universal Mobile Telecommunications System), FOMA (Freedom of Mobile Multimedia Access), EPS (Evolved Packet System), D-AMPS (Digital-Advanced Mobile Phone Service), CDMA2000 (Code Division Multiple Access 2000) or WiMAX (Worldwide Interoperability for Microwave Access). Common examples of RATs in this first category are 3GPP (3rd Generation Partnership Project) GPRS/EDGE (General Packet Radio Service/Enhanced Data rates for Global Evolution), 3GPP WCDMA/HSPA (Wideband Code Division Multiple Access/High-Speed Packet Access), 3GPP LTE/E-UTRAN (Long-Term Evolution/Evolved Universal Terrestrial Radio Access Network), and TD-SCDMA (Time Division Synchronous Code Division Multiple Access).

A second category includes RATs which are suitable for use in short-range wireless communication networks, such as Wi-Fi or WLAN (Wireless Local Area Network). One example of a RAT in this second category is the IEEE 802.11 family of wireless standards. Other examples include Bluetooth and NFC (Near-Field Communication).

Many UEs are enabled for use with more than one RAT, such as one or more RATs selected from the first category, as well as one or more RATs selected from the second category. A UE, enabled both for cellular access (e.g. 3GPP LTE/E-UTRAN and/or WCDMA/HSPA for use in EPS and/or UMTS) and for Wi-Fi access, is used herein as an example of a multi-RAT-enabled user device.

It may be desirable for 3GPP operators to move data traffic from a cellular networks to an alternative access network such as Wi-Fi, in order to reduce the load on the cellular network, and because Wi-Fi access typically uses unlicensed spectrum. However, owing to the inherent differences in architecture and operation between mobile telecommunications networks on the one hand and Wi-Fi networks on the other hand, in many existing setups there has not been any integration between the two. Allowing two such networks to co-exist in parallel but "hidden" from each other is fully acceptable, but not optimal from resource utilization, load distribution and user experience perspectives. Therefore, certain integration attempts have been made, in particular to use Wi-Fi to offload traffic from mobile networks. The existing mobility towards Wi-Fi is controlled by vendor-specific implementations. A common basic principle is for the UE to attempt to access and associate to a known Wi-Fi Access Point (AP) whenever it is detected. However, this does not take into account the load on the cellular network or the Wi-Fi network, which may result in a worse performance for the use.

FIG. 1 illustrates a network architecture for integration of a mobile telecommunications system 1 in the form of an Evolved Packet System (EPS) and a Wi-Fi access network 2. EPS was introduced in 3GPP Release 8 and Release 9. For detailed information about EPS, reference is made to 3GPP TS 23.401. The mobile EPS system 1 comprises an E-UTRAN 3 and an EPC 4. The E-UTRAN 3 has a combined base station and radio network controller known as eNodeB. The EPC 4 has units known as MME (Mobility Management Entity) and a Serving Gateway (SGW). The eNodeB is connected via the S1 interfaces, S1-MME and S1-U to the MME and SGW respectively. FIG. 1 also shows how the Wi-Fi access network 2 is connected to the Packet Data Network (PDN)-GW via the S2a interface and to the 3GPP AAA Server via the STa interface. The shown Wi-Fi access network is an exemplary deployment and contains a Wi-Fi Access Point (AP), a Wi-Fi Access Controller (AC) and a Broadband Network Gateway (BNG). In another example, the Wi-Fi AP may be co-located with a Residential Gateway (RG). In a further example, the Wi-Fi network may also comprise a Trusted WLAN Access Gateway (TWAG). In addition, the interface between the Wi-Fi AC and the PDN GW, i.e. the S2a interface, may also be implemented between the PDN GW and for example either the BNG or the RG.

Wi-Fi integration into Radio Access Network (RAN) may be either by combining both 3GPP and Wi-Fi in small pico base stations to gain access to the Wi-Fi sites with 3GPP technology and vice versa, or by integrating the Wi-Fi access tighter into the RAN by introducing enhanced network controlled traffic steering between 3GPP and Wi-Fi based on knowledge about the total situation on the different accesses. For this second level of integration, issues with UE controlled Wi-Fi selection must be avoided, such as selecting Wi-Fi when the Wi-Fi connection is bad or when the UE is moving, thus giving better end user performance and better utilization of the combined Wi-Fi and cellular radio network resources.

As a UE may access a service network via one or more different RANs, it is possible that a service suitable for one RAN may not be suitable for transmission via another RAN. For example, a Wi-Fi RAN may be much less congested than a 3GPP RAN. There is therefore a requirement for a 'service aware' node in the core network domain or in the service layer domain to adjust a level of service provided to the UE depending on the RAN being used or the conditions of the RAN being used. Consider the case where a UE receives streaming video. If a node in the core network domain or in the service layer domain can determine local conditions, it can adjust a quality and/or resolution of the video to ensure that the user experience is not impacted by poor network conditions. However, it is possible that two or more UEs may be allocated the same identifier (such as an IP address) by different gateway nodes or even by the same gateway node if they connect to different PDNs, the PDN to use is indicated by the Access Point Name (APN) and a gateway can support multiple APNs/PDNs. In this case a service aware node is unable to unambiguously identify a UE receiving data that is subject to modification by a service aware node since the only identifier available to a service aware node is the UE IP address.

SUMMARY

It is an object to provide a way for a node in a core node to unambiguously identity a UE in a communication network, even in cases where two or more UEs have been allocated the same identifier, such as an IP address.

According to a first aspect, there is provided a method of identifying a User Equipment (UE) in a communication network. A service aware control signalling node associated with a transmission path related to the UE receives a first message sent from a Radio Access Network (RAN) node associated with the UE on the transmission path. The first message initiates a communication between the RAN node and the control signalling node and includes an identity of the UE. On its own, the identity of the UE is not enough to unambiguously identify the UE, as described above. The control signalling node stores at a database an identity of the UE and an identity of the transmission path via which the first message was sent. An advantage of this is that the combination of the UE identity and the transmission path identity can be used to uniquely identify the UE.

As an option, the UE identity comprises an IP address of the UE.

As a further option, the transmission path identity comprises an identity of a mobility anchor point on the transmission path. Examples of a mobility anchor point include a Packet Data Network Gateway (PGW) and a Gateway GPRS Support Node (GGSN).

As an alternative option, the transmission path identity comprises an identity of an Access Point Name (APN) associated with the UE. As a further option, at least a portion of the transmission path comprises a tunnel. Examples of tunnels include an Ethernet layer tunnel such as a Virtual Local Area Network, and an IP layer tunnel such as a GRE. As a further option, the control signalling node receives a message from a mobility anchor point relating to the tunnel and determines the APN on the basis of an identity of the tunnel.

The first message is optionally addressed to the control signalling node. This has the advantage of making the control signalling node a control plane node, so it does not need to handle all user plane traffic but only control signalling.

According to a second aspect, there is provided a service aware control signalling node for use in a communication network. The service aware control signalling node is provided with a first receiver for receiving a first message from a RAN node associated with a UE on a transmission path. The first message initiates a communication between the RAN node and the control signalling node, and includes an identity of the UE. A processor is provided for arranging storing, at a database, the identity of the UE and an identity of the transmission path via which the first message was sent. An advantage of this is that the combination of the UE identity and the transmission path identity uniquely identify the UE.

The UE identity optionally comprises an IP address of the UE, and the transmission path identity optionally comprises an identity of a mobility anchor point on the transmission path.

As an alternative, the transmission path identity comprises an identity of an APN associated with the UE. As a further option, the APN is further associated with a tunnel, such as a VLAN or a GRE tunnel. The service aware control signalling node is optionally provided with a second receiver for receiving a message from a mobility anchor point relating to the tunnel, wherein the processor is further arranged to determine the APN on the basis of an identity of the tunnel.

According to a third aspect, there is provided a mobility anchor point for use in a communication network. The mobility anchor point is provided with a receiver for receiving a first message sent from a RAN node associated with a UE on a transmission path. The first message initiates a communication between the RAN node and a service aware control signalling node and includes an identity of the UE. A transmitter is also provided for forwarding the first message to the service aware control signalling node. As a further option, the mobility anchor point is provided with a processor arranged to determine that the first message comprises an address of the service aware control signalling node and consequently zero-rate the first message for charging purposes. As an option, subsequent messages addressed to the service aware control signalling node are also identified and zero-rated for charging purposes. Examples of a mobility anchor point include a PGW and a GGSN.

According to a fourth aspect, there is provided a computer program comprising computer readable code which, when run on a control signalling node, causes the control signalling node to perform the method described above in the first aspect.

According to a fifth aspect, there is provided a computer program comprising computer readable code which, when run on a mobility anchor point, causes the mobility anchor point to behave as a mobility anchor point as described above in the third aspect.

According to a sixth aspect, there is provided a computer program product comprising a non-transitory computer readable medium and a computer program as described above in either of the fourth or fifth aspects, wherein the computer program is stored on the computer readable medium.

DETAILED DESCRIPTION

Figure 1:
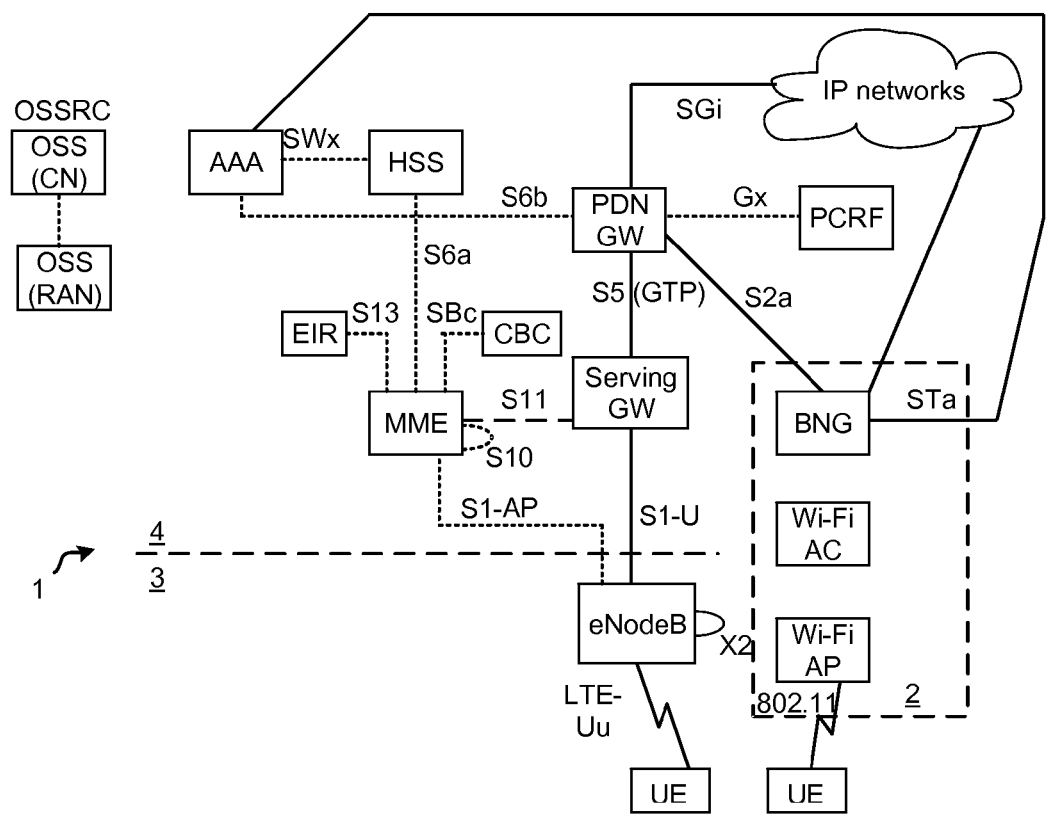
FIG. 1 illustrates schematically in a block diagram a network architecture integrating a mobile telecommunications system with a Wi-Fi access network.
Figure 2:
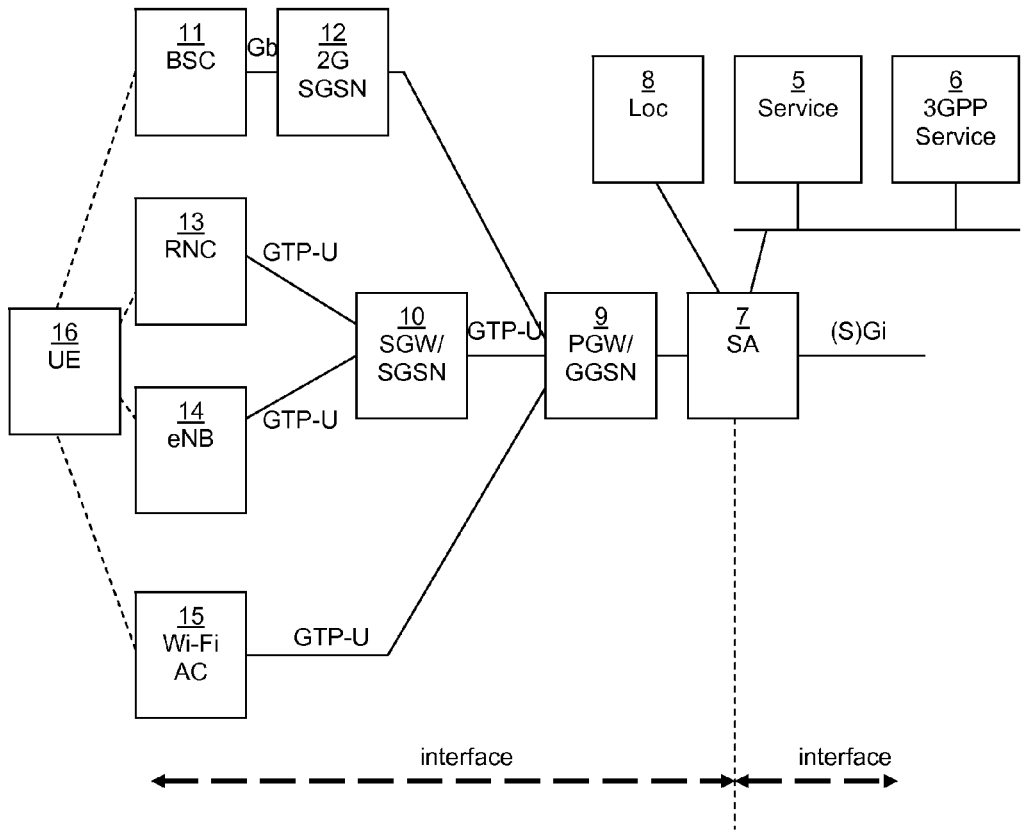
FIG. 2 illustrates schematically in a block diagram an exemplary communications network architecture.

Applications traversing wireless networks may require differentiated support in the RAN to provide a satisfying Quality of Experience (QoE) for an end-user. Furthermore, taking into account properties of the data being sent over the RAN (such as whether it is high definition video or a voice call) allows more efficient allocation of available resources such as spectrum, transmission power in the network, battery lifetime in the UE etc. As described above, this can be achieved in part by providing awareness to nodes in the RAN of the service being provided, and awareness to the service provider of conditions in the RAN. FIG. 2 shows a simplified network architecture showing two service nodes 5, 6, a service aware control signalling node 7 for signalling control signals relating to service aware features and a locator node 8 that contains a database for storing location information relating to a UE that is receiving service aware data.

The service aware control signalling node 7 is arranged to communicate with a node in the RAN in order to exchange service aware control signalling. Control signalling is used to inform nodes about the data being sent from a service node via the RAN towards UE, and in some cases to alter an aspect of behaviour relating to the data. For example, the RAN node may inform the service aware control signalling node 7 about conditions in the RAN, which prompts the service aware control signalling node 7 to modify data sent from the service network. If RAN conditions deteriorate then the service aware control signalling node 7 may arrange for a service node providing media to reduce a quality of the media to ameliorate conditions in the RAN. Similarly, the service aware control signalling node 7 may inform the RAN node of expected data that the RAN will handle, allowing the RAN to reserve or allocate resources before receiving the data.

The control signalling node is connected in this example to a mobility anchor point such as a Packet Data Network Gateway (PGW)/Gateway GPRS support node (GGSN) 9, which is in turn connected to a SGW/Serving GPRS Support Node (SGSN) 10. Four exemplary RANs are shown; one comprising a Base Station Controller (BSC) 11 and a 2G SGSN 12 connected to the PGW/GGSN 9, one comprising a Radio Network Controller (RNC) 13 connected to the SGW/SGSN 10, one comprising an evolved NodeB (eNB) 14 connected to the SGW/SGSN 10 and one comprising a Wi-Fi Access Controller (AC) 15 connected to the PGW/GGSN 9. A UE 16 may attach to the network via any of the RANs.

An interface is provided between the RAN and the service aware control signalling node 7. In the case of a GERAN, the interface is terminated in the 2G SGSN 12, and 2G SGSN 12 relays interface signalling to the BSC 11 on a further interface. The interface allows service aware control signalling to be sent. Interface signalling may be transported Inband' or 'outband'. Inband signalling involves tunnelling the interface signalling using a UE's existing GTP tunnels. 'Outband' signalling involves establishing dedicated signalling connections between RAN nodes and the service aware control signalling node 7 across an operator's IP network. The description below is concerned with 'outband' signalling.

In the example of FIG. 2, outband signalling is sent between the control signalling node 7 and a RAN node, such as the BSC 11, the RNC 13, the eNB 14 or the Wi-Fi AC 15. Outband signalling is sent separately from user plane paths. The service aware control signalling node 7 must somehow know which RAN node is currently serving the UE 16. The Locator node 8 (which may be functionally disposed at the service aware control signalling node 7 or located separately) is provided for informing the service aware control signalling node 7 which RAN node serves the UE. Each RAN node currently serving the UE 16 registers the UE 16 during a registration procedure. This may require the RAN to provide the RAN node IP address, RAN node reference, International Mobile Subscriber Identity (IMSI) if available and UE IP address if available Taking an example where the RAN node is an eNodeB 14, when a new UE 16 Context is established in the eNB 14, it registers the UE 16 at the locator node 8. In the case the service aware control signalling node 7 need to provide service aware signalling relating to the UE, and it does not know the serving RAN node (in this case, the eNodeB 14), it queries the Locator node 8 to obtain the identity of the eNodeB 14 serving the UE 16. Once the look-up has been performed the service aware control signalling node 7 can communicate with the eNodeB 14.

Another usage for the locator node 8 is to support Wi-Fi traffic steering functionality. When a UE attempts to connect to a RAN node (e.g. the Wi-Fi AC 15), the Wi-Fi AC 15 may query the locator node, receive the identity/address of a RAN node currently serving the UE 16, and establish a direct communication channel to that RAN node in order to determine whether or not to allow the UE to access the Wi-Fi AC 15.

A problem arises in the case where the same IP address is assigned to two different UEs by different PGW/SGSNs. Similarly, a single PGW/GGSN may be configured with an APN towards the public Internet and also a corporate APN(s), in which case the IP address may be reused for different UEs. In either case, the locator node 8 stores the UE IP address, but the UE IP address cannot be used to unambiguously identity the UE 16. The service aware control signalling node 7 (or a RAN node such as a Wi-Fi AC 15 in the case of traffic steering) therefore cannot query the locator node 8 using the UE IP address to obtain the serving RAN node.

Figure 3:
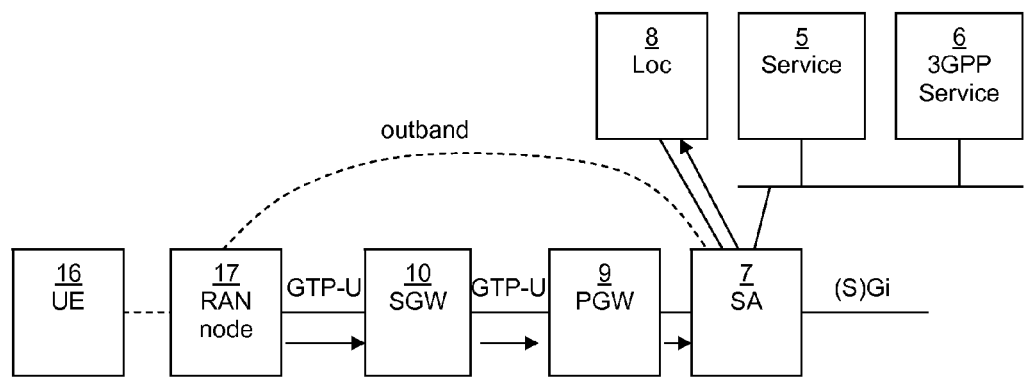
FIG. 3 illustrates schematically in a block diagram a simplified exemplary communications network architecture.

In order to address this problem, UE 16 registration is enhanced to allow a RAN node to register the UE 16 using the user plane path. FIG. 3 shows a simplified version of FIG. 2, in which a RAN node 17 is shown. This may be, for example, a BSC 11, a RNC 13, an eNB 14 or a Wi-Fi AC 15, although it will be appreciated that other types of RAN node may be used. The RAN node 17 has an outband connection with the service aware control signalling node 7.

The RAN node 17 registers the UE 16 using the user plane path shown by the arrows in FIG. 3. The registration to the locator node 8 is performed via the service aware control signalling node 7 using the UE's 16 user plane. The service aware control signalling node 7 may see all UE traffic from the interconnected PGW 9, or it may see traffic that is destined for the service aware control signalling node 7. The service aware control signalling node 7 may also obtain information about UE sessions via the accounting interface, so that the service aware control signalling node 7 appears to gateway nodes as an accounting server. Note that the registration in the locator node may store further information, such as an IMSI relating to the UE 16, as the IMSI may be used by the Wi-Fi AC 15 where querying the locator node 8 to support traffic steering.

The enhanced registration to the locator node 8 is performed using the UE's user plane path, which necessarily traverses the serving mobility anchor point 9 (PGW or GGSN). The service aware control signalling node 7 is aware of the identity of the mobility anchor point 9 it interfaces with. It therefore registers the UE 16 with the locator node 8 using not only the UE 16 IP address, but also the address (or another identity) of the mobility anchor point 9. The UE's 16 registration record provided by the RAN is therefore enhanced by the service aware control signalling node 7 with the mobility anchor point 9 identity.

Figure 4:
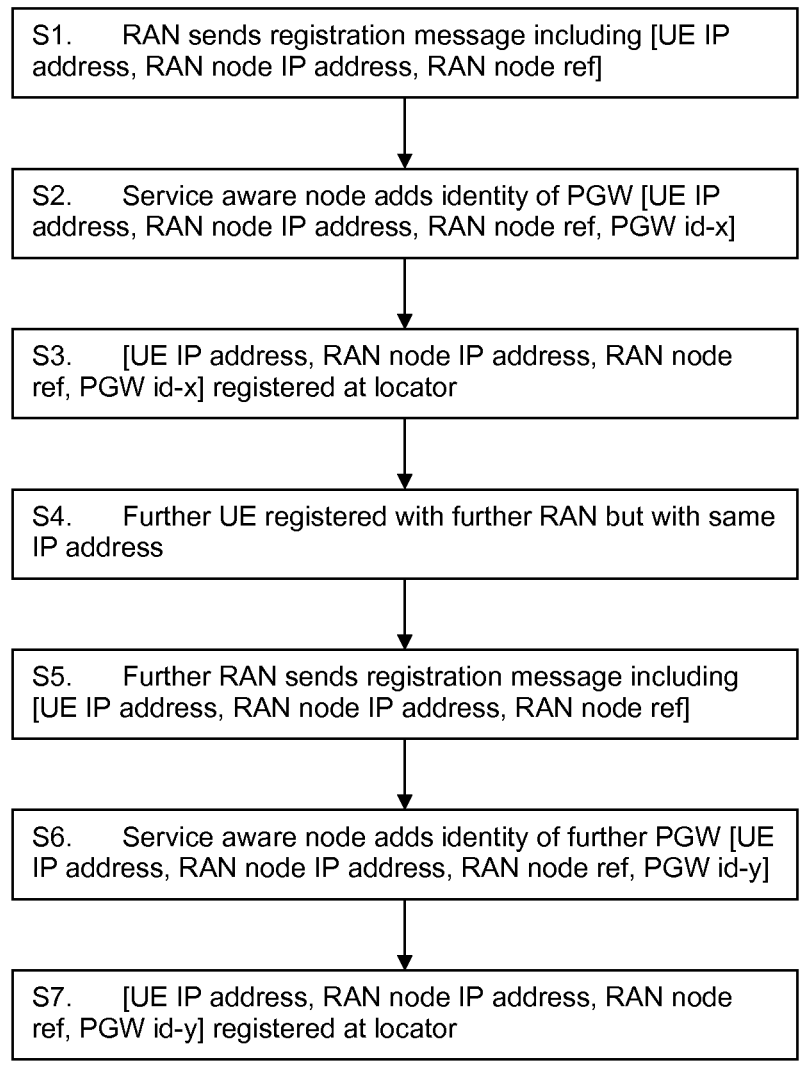
FIG. 4 is a flow diagram showing steps of an exemplary embodiment.

The process is shown in FIG. 4, with the following numbering corresponding to that of FIG. 4:

S1. The RAN node 17 sends a registration message along the user plane path via the mobility anchor point 9 to the service aware control signalling node 7. The registration record contains [UE IP address, RAN node IP address, RAN node ref].

S2. The service aware control signalling node 7 is aware of the identity of the mobility anchor point 9, so it adds the identity of the mobility anchor point (in this example, a PGW). The registration record now contains [UE IP address, RAN node IP address, RAN node ref, PGW id-x]. The identity of the mobility anchor point can be thought of as a transmission path identifier, as the mobility anchor point is on the transmission path.

S3. The new registration record is registered at the locator node 8.

S4. A further UE registers with a further RAN node but is assigned the same IP address as the first UE 16.

S5. The further RAN node sends a further registration message along the user plane path via a further mobility anchor point 9 to the service aware control signalling node 7. The further registration record contains [UE IP address, RAN node IP address, RAN node ref]. This is indistinguishable from the registration record of the first UE 16.

S6. The service aware control signalling node 7 is aware of the identity of the further mobility anchor point, so it adds the identity of the further mobility anchor point (in this example, a PGW). The further registration record now contains [UE IP address, RAN node IP address, RAN node ref, PGW id-y].

S7. The new further registration is registered at the locator node 8. In this way, both UE's are registered with the same IP address, but the addition of the identity of different mobility anchor point identifiers (PGW id-x and PGW id-y in this example) to the registration records means that a node performing a lookup at the locator node 8 can distinguish between the two records, even where multiple UE's use the same address, by using an identity of the mobility anchor point in a query.

Figure 5:
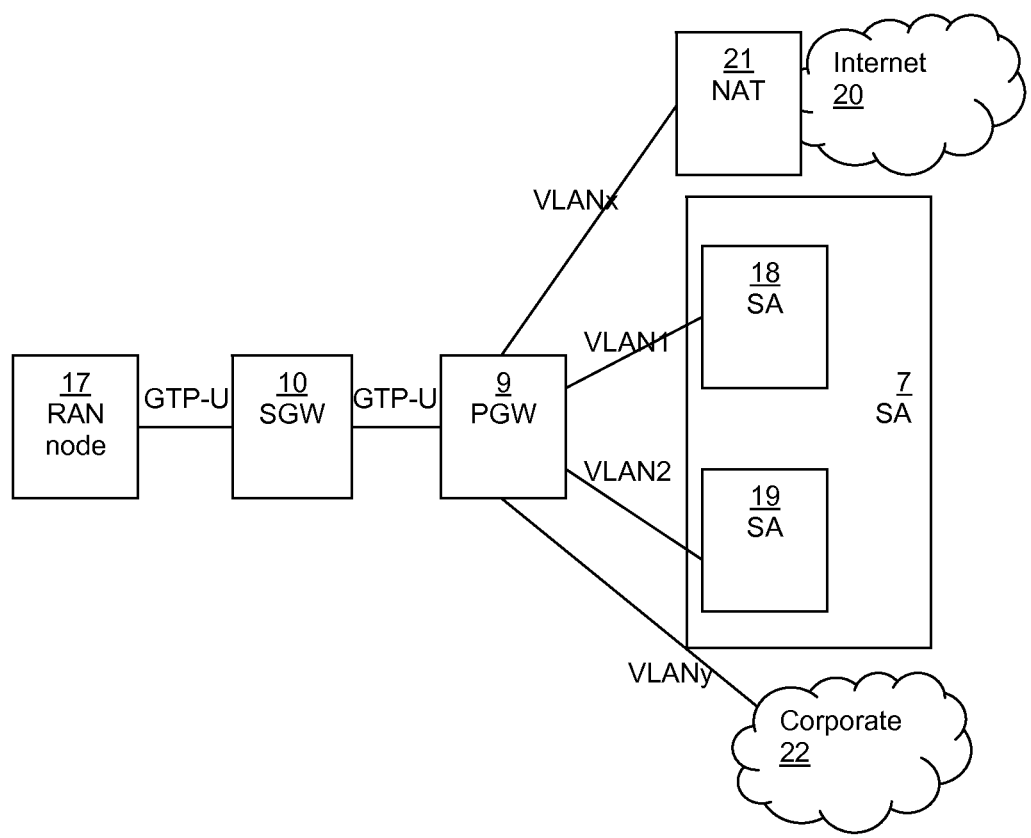
FIG. 5 illustrates schematically in a block diagram an exemplary communications network architecture using two APNs.

There are some circumstances where overlapping IP addresses occur at a single mobility anchor point. For example, and IP address may be allocated for a corporate network in addition to an Internet network. When a UE 16 indicates a corporate APN, the mobility anchor point 9 uses an IP addresses from the corporate network, This situation is illustrated in FIG. 5, in which a first service aware control signalling node 18 and a second service aware control signalling node 19 are shown. An Internet APN session is shown using a Virtual Local Area Network (VLAN) designated VLANx, in which data is sent between an Internet 20 and the PGW 9 via a Network Address Translation (NAT) function 21. Control signalling for service aware features is performed by the first service aware control signalling node 18 using VLAN1 between the first service aware control signalling node 18 and the PGW 9. A Corporate APN session involves data being sent between a Corporate network 22 and the PGW 9 using VLANy. This may not be subject to service aware control signalling.

However, in the case where the Corporate APN session requires service aware control signalling, the second service aware control signalling node 19 uses VLAN2 between the second service aware control signalling node 19 and the PGW 9. Note that the service aware control signalling nodes may be embodied in a single service aware control signalling node 7, and for the following paragraphs this is assumed to be the case.

Figure 6:
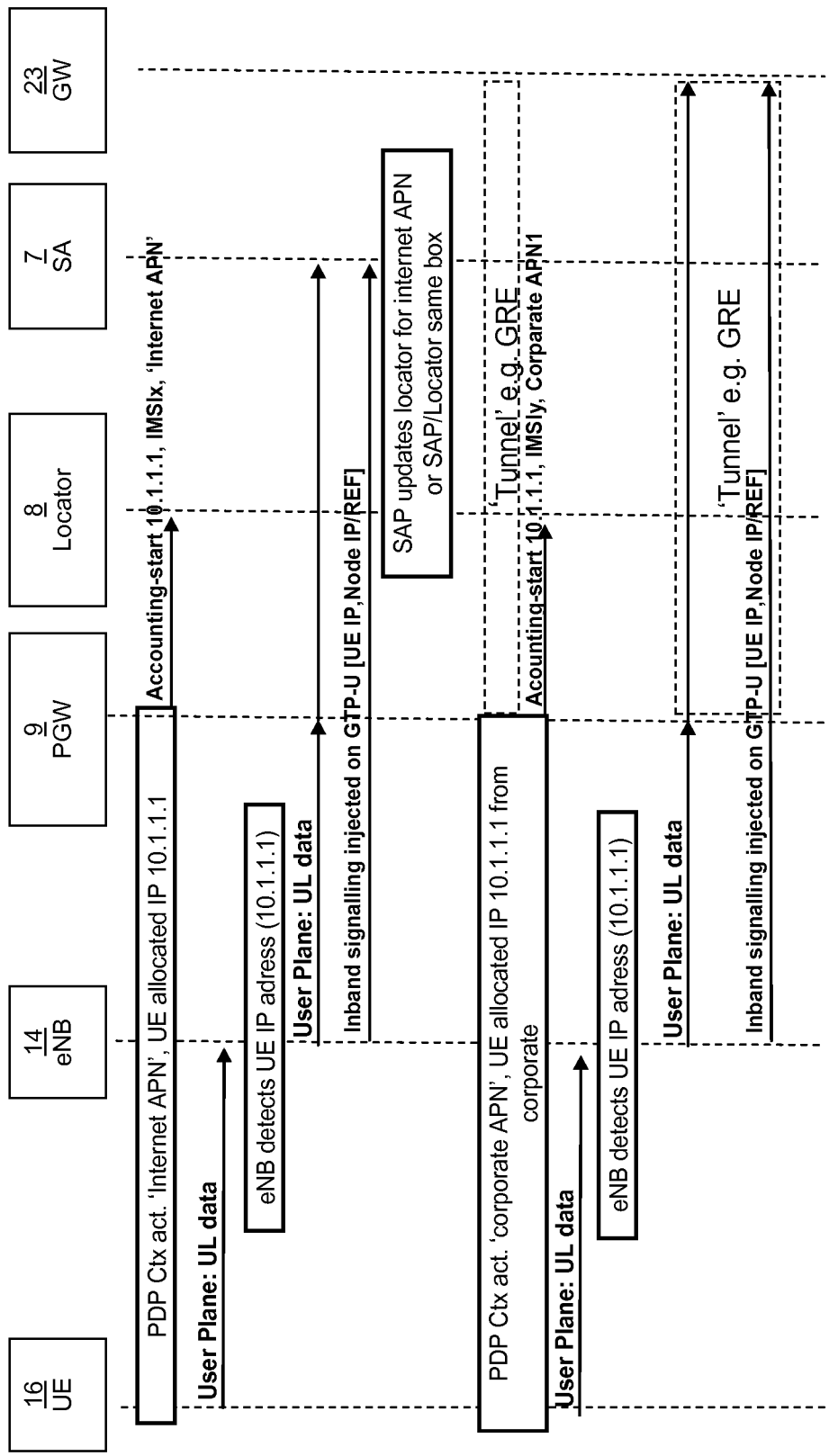
FIG. 6 is a signalling diagram showing registration of a UE via an Internet APN.

FIG. 6 shows the registration of a UE using an Internet APN with an IP address of 10.1.1.1, and another UE using a corporate APN obtained via a gateway 23 to the corporate network using the same IP address. In this example, a transmission path identifier is based on the APN used, so the UE 16 is registered at the locator with the Internet APN as a transmission path identifier.

Take the example where service aware features only operate on 'Internet APN' sessions. For the Internet APN session, the service aware control signalling node 7 is only aware of UE 16 traffic using the Internet APN and updates the registration record at the locator 8 using the Internet APN as the transmission path identifier. Corporate data traffic is tunnelled from the PGW 9 to the corporate network 22 via a corporate gateway 23, and so is not visible to the service aware control signalling node 7. Even if two entries exist for the UE's IP address in the locator node 8, only one IP address entry (for Internet APN) is enhanced with the transmission path identifier identifying the Internet APN. The two IP addresses can therefore be distinguished from one another by the presence in one of the records of an identifier of the transmission path in the form of the Internet APN.

The use of different APNs can be thought of as the whole user plane is being put on different transmission paths. The transmission path that the service aware control signalling node 7 identifies is the APN (e.g. VLANx is associated with the Internet APN, VLANy is associated with the Corporate APN) to provide a unique identifier. By providing the service aware control signalling node 7 with a routable IP address, the service aware control signalling node 7 can easily find messages sent using a VLAN as the PGW 9 can be configured to route (in a virtual router that exists for each APN) relevant messages directly to the service aware control signalling node 7 and the user plane traffic directly to its destination (for example, towards the Internet). For example, if the PGW 9 receives messages from the RAN 20 to be sent using VLANx, it is configured to route any relevant messages to the service aware control signalling node 7 using VLAN1. This essentially makes the service aware control signalling node 7 a control plane node so that it need not handle all user plane traffic. Only relevant messages sent by the RAN are routed to the service aware control signalling node 7 by the PGW 9.

In the example of FIG. 5, the PGW 9 supports the Internet APN using VLANx and the Corporate APN using VLANy. If the PGW 9 needs to send traffic to the service aware control signalling node 18 relating to VLANx, it uses VLAN1 and if the PGW 9 needs to send traffic to the service aware control signalling node relating to VLANy, it uses VLAN2. In this case, even if the same UE IP address is used for both the Internet and the Corporate APN, the service aware control signalling node 7 knows that if it receives a message on VLAN 1 it is associated with the Internet APN, so it can add the APN to the UE IP address and make a unique identifier for storing at the locator node 8.

Figure 7:
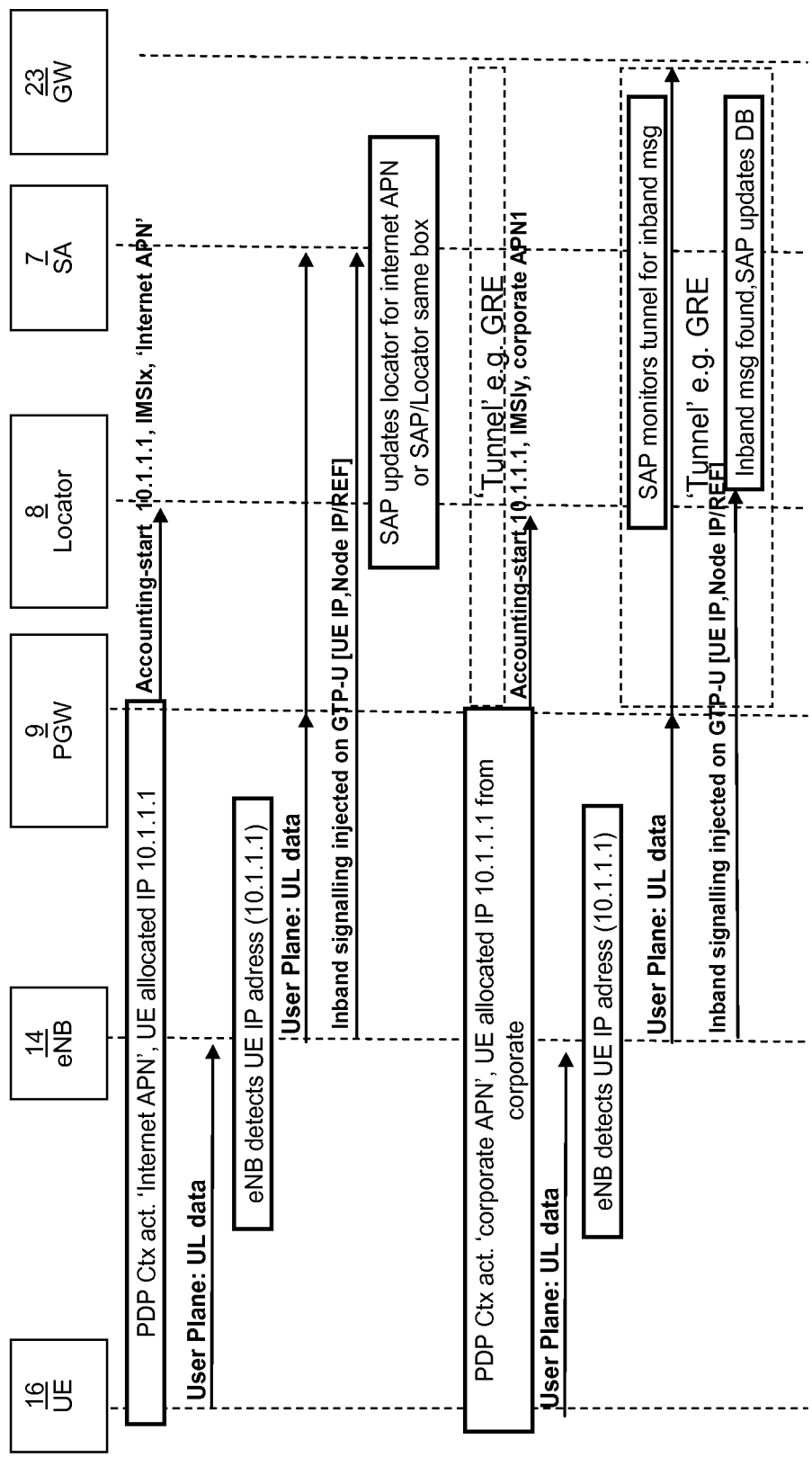
FIG. 7 is a signalling diagram showing registration of a UE via an Internet APN and a corporate APN.
Figure 8:
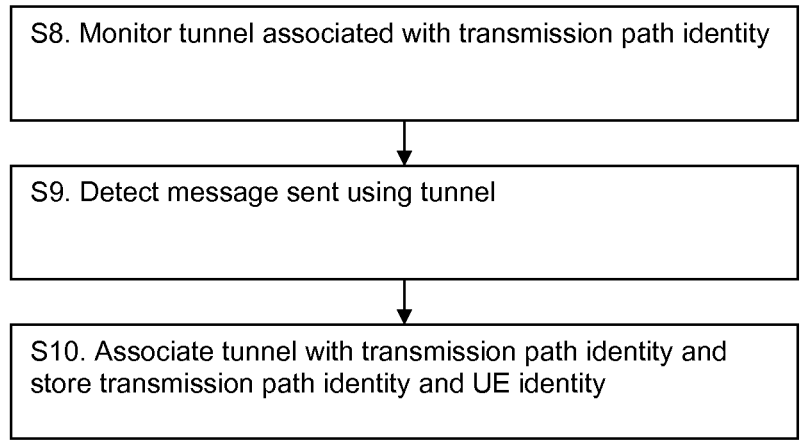
FIG. 8 is a flow diagram showing steps of an exemplary method.

The example described above associates an Internet APN with a UE IP address in order to form a unique identifier. However, if also the case with corporate accesses should be handled, the Corporate APN is handled as shown in FIG. 7. A tunnel to the Corporate gateway 23 is accessible to the service aware control signalling node 7. In this case the transmission path identifier is a tunnel identifier (e.g. identifying a GRE tunnel) or a VLAN identity. The service aware control signalling node 7 monitors the tunnel and if an inband registration message is detected, then the service aware control signalling node 7 removes this message and updates the locator node 8 with the APN associated with the tunnel. This is illustrated in FIG. 8, with the following numbering corresponding to that of FIG. 8:

S8. The service aware control signalling node 7 monitors a transmission path such as a GRE tunnel associated with the APN.

S9. An inband registration message is detected sent using the tunnel.

S10. The tunnel identity (e.g. for Ethernet tunnelling technique, a VLAN identity or for IP layer tunnelling technique, a GRE tunnel identity) is associated with the Corporate APN and the locator node 8 is updated with a new registration message including the Corporate APN identity in addition to the UE IP address.

Figure 9:
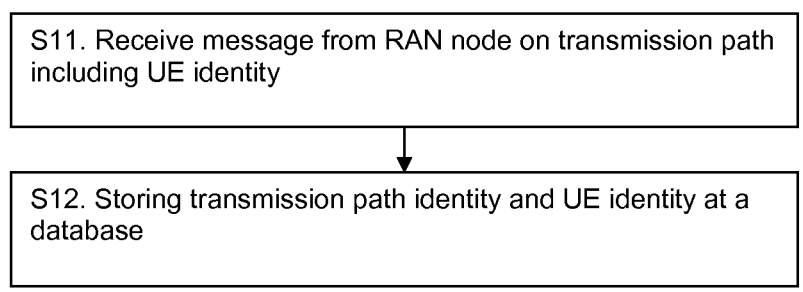
FIG. 9 is a flow diagram showing steps of an exemplary method.

FIG. 9 is a flow diagram illustrated at a high level the concepts described above. The following numbering corresponds to that of FIG. 9.

S11. The service aware control signalling node 7 receives a message from the RAN node 17 associated with the UE on the transmission path. The first message initiates a communication between the RAN node 17 and the service aware control signalling node 7.

S12. The UE IP address and an identity of a transmission path (as described above, examples of this are the identity of a mobility anchor point or an identity of an APN associated with the UE 16) are stored at a database (which may be located at the locator node 8).

Figure 10:
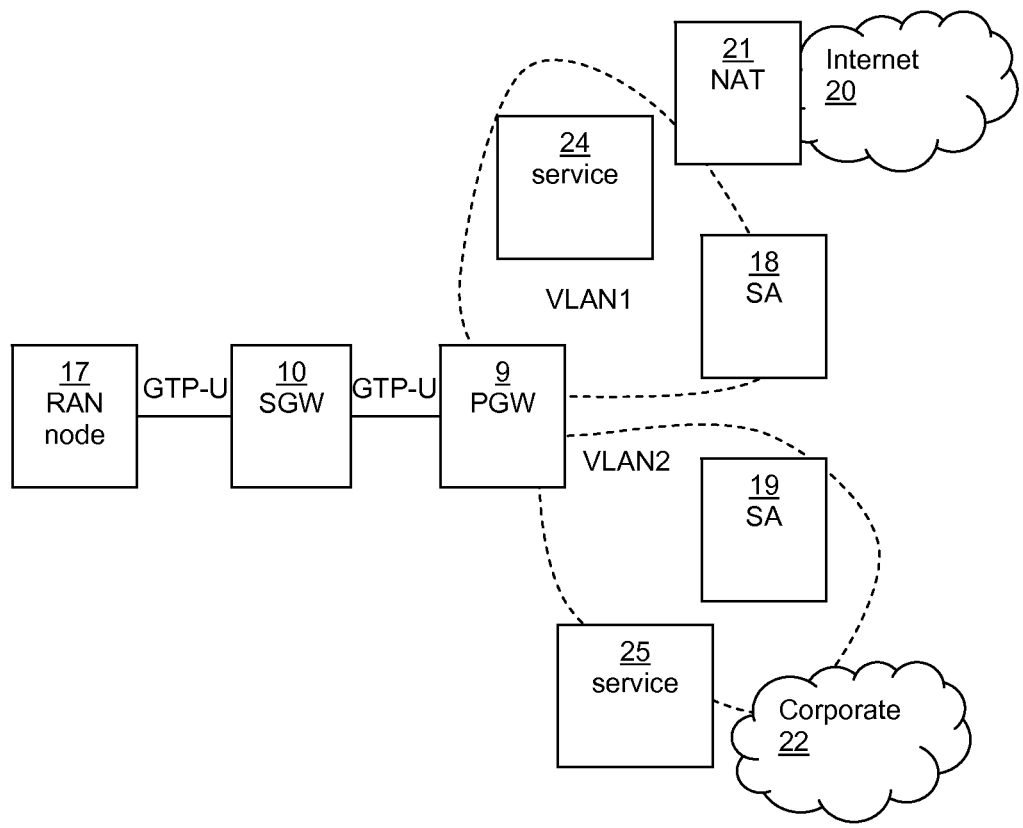
FIG. 10 illustrates schematically in a block diagram a further exemplary communications network architecture using two APNs.

Turning now to FIG. 10, there is illustrated an alternative exemplary network to that shown in FIG. 5. In the network of FIG. 5, the User Plane traffic and control signalling are sent using separate VLANs, and the control signalling is addressed to the first and second service aware control signalling nodes 18, 19 and sent by the PGW 9.

In a first example with reference to FIG. 10, the User Plane traffic and control signalling are sent using the same VLAN. For example, a service node 24 and the first service aware control signalling node 18 uses VLAN1, and the second service aware control signalling node 19 and Corporate User Plane traffic uses VLAN2. The service aware control signalling nodes 18, 19 are explicitly addressed and the PGW 9 routes control signalling to each service aware control signalling node 18, 19. The service aware control signalling nodes 18, 19 may monitor User Plane traffic since it is visible on the VLAN In a second example with reference to FIG. 10, the User Plane traffic and control signalling are sent using the same VLAN. A service node 24 and the first service aware control signalling node 18 uses VLAN1, and the second service aware control signalling node 19 and Corporate User Plane traffic uses VLAN2. . The service aware control signalling nodes 18, 19, handle both User Plane and Control Plane traffic, and the service aware control signalling nodes 18, 19 receive and forward all User Plane traffic to and from the service nodes 24, 25 in their respective VLAN. The control signalling on the other hand is handled by the service aware control signalling nodes 18, 19.

Figure 11:
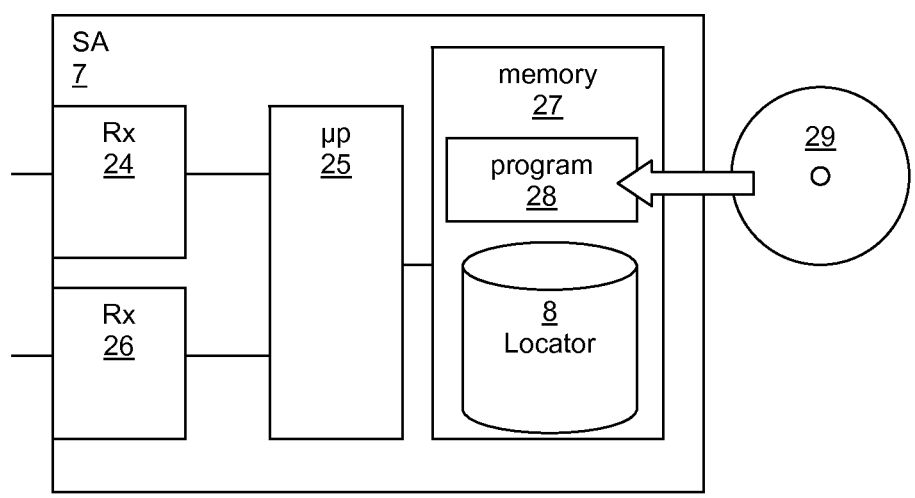
FIG. 11 illustrates schematically in a block diagram an exemplary service aware control signalling node.

FIG. 11 illustrates an exemplary service aware control signalling node 7. It is provided with a first receiver 24 for receiving a message initiating a communication with the RAN node 17. The message includes an identity of the UE 16. A processor 25 is provided for arranging storing, at the Locator node, the identity of the UE 16 and an identity of the transmission path via which first message was sent. As described above, the combination of the UE identity and the transmission path identity are usable to uniquely identify the UE. Note that the transmission path identifier may be any suitable identifier as described above, such as an identity of a mobility anchor point or an identity of an APN. A second receiver 26 may be provided for receiving a message from the mobility anchor point relating to a VLAN. The processor 25 determines the APN on the basis of an identity of the VLAN.

A non-transitory computer readable medium in the form of a memory 27 may be provided. This can be used to store a computer program 28 which, when executed by the processor 25, causes the service aware control signalling node 7 to behave as described. Note that the computer program may also be stored on an external memory 29 such as a flash drive. Note also that the Locator node 8 may be a physically separate entity, or may be a function of the service aware control signalling node 7.

Figure 12:
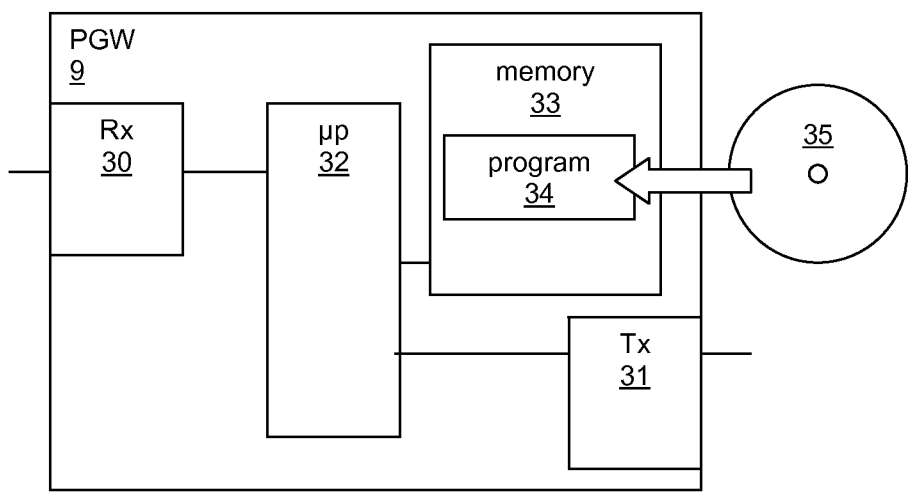
FIG. 12 illustrates schematically in a block diagram an exemplary mobility anchor point.

FIG. 12 illustrates an exemplary mobility anchor point, such as a PGW 9. The PGW 9 is provided with a receiver 30 for receiving a first message sent from the RAN node 17 associated with the UE 16 on the transmission path. The first message initiates a communication between the RAN node 17 and a service aware control signalling node 7, and includes an identity of the UE 16. A transmitter 31 is also provided for forwarding the first message to the service aware control signalling node 7. A processor 32 is provided for controlling the operation of the PGW 9.

A non-transitory computer readable medium in the form of a memory 33 may be provided. This can be used to store a computer program 34 which, when executed by the processor 32, causes the PGW 9 to behave as described. Note that the computer program may also be stored on an external memory 35 such as a flash drive.

The techniques described above allow service aware signalling and Wi-Fi traffic steering to be introduced even in networks where overlapping UE IP addresses are possible. The UE and its serving RAN node can be unambiguously identified by storing a transmission path identifier in addition to the UE IP address (or other identifier). A further advantage of the techniques described above is that they can be introduced without functional impact on the core network nodes, for some of the deployment scenarios exemplified above, minor configuration is needed. . This allows Wi-Fi traffic steering and service aware functions to be introduced into some legacy networks that might not otherwise be able to support such functions.

It will be appreciated by the person of skill in the art that various modifications may be made to the above-described embodiments without departing from the scope of the present invention as described in the appended claims.

The following abbreviations have been used in this specification:
3GPP 3rd Generation Partnership Project
AAA Authentication, Authorization and Accounting
AC Access Controller
AP Access Point
BNG Broadband Network Gateway BSC Base Station Controller
BTS Base Transceiver Station
CDMA2000 Code Division Multiple Access 2000
D-AMPS Digital-Advanced Mobile Phone Service
eNB evolved NodeB
EDGE Enhanced Data rates for Global Evolution
EPC Evolved Packet Core
EPS Evolved Packet System
E-UTRAN Evolved Universal Terrestrial Radio Access Network
FOMA Freedom of Mobile Multimedia Access
GGSN Gateway GPRS Support Node
GPRS General Packet Radio Service
GRE Generic Router Encapsulation
GSM Global System for Mobile communication
HSPA High-Speed Packet Access
IMSI International Mobile Subscriber Identity
LTE Long Term Evolution
MME Mobility Management Entity
NAI Network Access Identifier
NAT Network Address Translation
PGW Packet Date Network Gateway,
RAT Radio Access Technology
RG Residential Gateway
RNC Radio Network Controller
RRC Radio Resource Control
SGSN Serving GPRS Support Node
SGW Serving Gateway
TD-SCDMA Time Division Synchronous Code Division Multiple Access
TWAG Trusted WLAN Access Gateway
UE User Equipment
UMTS Universal Mobile Telecommunications System
VLAN Virtual Local Area Network
WCDMA Wideband Code Division Multiple Access
WLAN Wireless Local Area Network
WLAN HO DP WLAN Handover Decision Point

The invention claimed is:

1. A method of identifying a User Equipment in a communication network, the method comprising, at a control signalling node associated with a transmission path related to the User Equipment:
receiving a first message sent from a Radio Access Network node associated with the User Equipment on the transmission path, the first message initiating a communication between the Radio Access Network node and the control signalling node, and the first message including an identity of the User Equipment; and
storing, at a database, the identity of the User Equipment and an identity of the transmission path via which the first message was sent, wherein a combination of the User Equipment identity and the transmission path identity uniquely identifies the User Equipment.

2. The method according to claim 1, wherein the User Equipment identity comprises an IP address of the User Equipment.

3. The method according to claim 1, wherein the transmission path identity comprises an identity of a mobility anchor point on the transmission path.

4. The method according to claim 3, wherein the mobility anchor point is selected from any of a Packet Data Network Gateway and a Gateway GPRS Support Node.

5. The method according to claim 1, wherein the transmission path identity comprises an identity of an Access Point Name associated with the User Equipment.

6. The method according to claim 5, wherein at least a portion of the transmission path comprises a tunnel.

7. The method according to claim 6, wherein the tunnel is selected from any of an Ethernet layer tunnel and an IP layer tunnel.

8. The method according to claim 6, further comprising receiving a message from a mobility anchor point relating to the tunnel and determining the Access Point Name on the basis of an identity of the tunnel.

9. The method according to claim 1, wherein the first message is addressed to the control signalling node.

10. A service aware control signalling node for use in a communication network, the service aware control signalling node comprising:
a first receiver for receiving a first message from a Radio Access Network node associated with a User Equipment on a transmission path related to the User Equipment, the first message initiating a communication between the Radio Access Network node and the service aware control signalling node, and the first message including an identity of the User Equipment; and
a processor arranged for storing, at a database, the identity of the User Equipment and an identity of the transmission path via which the first message was sent, wherein a combination of the User Equipment identity and the transmission path identity uniquely identifies the User Equipment.

11. The service aware control signalling node according to claim 10, wherein the User Equipment identity comprises an IP address of the User Equipment and the transmission path identity comprises an identity of a mobility anchor point on the transmission path.

12. The service aware control signalling node according to claim 10, wherein the transmission path identity comprises an identity of an Access Point Name associated with the User Equipment.

13. The service aware control signalling node according to claim 12, wherein the Access Point Name is further associated with a tunnel.

14. The service aware control signalling node according to claim 13, further comprising a second receiver for receiving a message from a mobility anchor point relating to the tunnel, wherein the processor is further arranged to determine the Access Point Name on the basis of an identity of the tunnel.

15. A mobility anchor point for use in a communication network, the mobility anchor point comprising:
a receiver for receiving a first message sent from a Radio Access Network node associated with a User Equipment on a transmission path related to the User Equipment, the first message initiating a communication between the Radio Access Network node and a service aware control signalling node, and the first message including an identity of the User Equipment; and
a transmitter for forwarding the first message to the service aware control signalling node.

16. The mobility anchor point according to claim 15, further comprising a processor arranged to determine that the first message comprises an address of the service aware control signalling node and consequently zero-rate the first message for charging purposes.

17. The mobility anchor point according to claim 16, wherein the processor is arranged to determine that a subsequent message comprises an address of the service aware control signalling node and consequently zero-rate subsequent message for charging purposes.

* * * * *